Dec. 5, 1967   G. EISENMAN ET AL   3,356,596
GLASS ELECTRODE COMPOSITION AND METHOD OF USING SAME FOR
MEASURING POTASSIUM ION CONCENTRATION
Filed Sept. 21, 1964
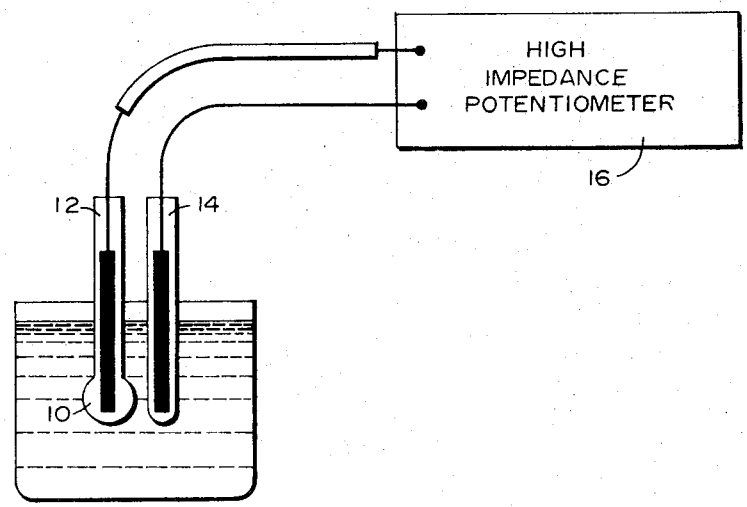
INVENTOR.
George Eisenman
James W. Ross
BY
ATTORNEY great # United States Patent Office 3,356,596
Patented Dec. 5, 1967

3,356,596
GLASS ELECTRODE COMPOSITION AND METHOD OF USING SAME FOR MEASURING POTASSIUM ION CONCENTRATION
George Eisenman, Salt Lake City, Utah, and James W. Ross, Newton, Mass., assignors to Corning Glass Works, Corning, N.Y., a corporation of New York
Filed Sept. 21, 1964, Ser. No. 397,734
16 Claims. (Cl. 204—1)

This invention relates to glass electrodes, and the glass compositions for active or sensing portions thereof, that have high selectivity for $K^+$ in the presence of $Na^+$, as well as additionally in the presence of $H^+$ and other cations, over a wide range of pH. A primary object and purpose of the glass electrodes according to the present invention is to selectively measure $K^+$ activity or concentration in ionic mixtures or solutions.

Recently glass electrodes having high selectivity for $K^+$ in mixtures of $K^+$ and $Na^+$ were developed by utilizing, for the sensing or membrane portions of the electrodes, glass compositions consisting primarily of the three components: (1) oxide of alkali metal selected from the group consisting of sodium, potassium, rubidium and cesium, (2) alumina and (3) glass network forming oxide. Compositions in which the mole percent of $Na_2O$ is at least equal to twice the sum of $Al_2O_3$ plus 6.25 are known (from United States Patent 2,829,090) to be as much as 5.5 times as selective for $K^+$ than for $Na^+$. Other compositions in which the ratio of mole percent $K_2O$ (or $Rb_2O$ or $Cs_2O$) to mole percent $Al_2O_3$ is at least substantially 1.5 are known (from United States Patent 3,041,252) to be at least about 5 times as selective for $K^+$ than for $Na^+$.

We have now discovered glass electrodes having good selective sensitivity to $K^+$ in the presence of $Na^+$, as well as additionally in the presence of $H^+$ and other cations, over a wide range of pH can be provided by forming the sensing portion or membrane of a novel glass composition consisting essentially of gallium oxide, glass network forming oxide (such as $SiO_2$ and/or $GeO_2$) and oxide of alkali metal selected from the group consisting of potassium where the ratio of the mole percent of $K_2O$ to $Ga_2O_3$ is at least 1.6, rubidium where the ratio of the mole percent of $Rb_2O$ to $Ga_2O_3$ is at least 1.0, cesium where the ratio of the mole precent of $Cs_2O$ to $Ga_2O_3$ is at least 0.95, and mixtures of these named alkali metals where the sum of 0.625 times the mole percent $K_2O$ plus the mole percent $Rb_2O$ plus 1.053 times the mole percent $Cs_2O$ at least equals the mole percent of $Ga_2O_3$. In defining the glass composition according to this invention, the specified mole percent ratios are determined by calculating all of each of the named alkali metals and the gallium in the glass composition as the indicated oxide (e.g. potassium as $K_2O$, etc.). Factors of selectivity for our novel $K^+$ selective glass compositions are comparable with the prior compositions mentioned above.

The invention will best be understood with reference to the accompanying drawing wherein the sole figure diagrammatically illustrates conventional equipment for measuring cation concentration or activity and employing one embodiment of an otherwise conventional glass electrode 12 with an active portion, bulb or membrane 10 made of a glass composition according to this invention. The glass electrode 12 is operatively connected to a standard half-cell 14, such as saturated KCl-calomel, via conventional high impedance, high gain electrometric amplification equipment 16.

The instrument may be calibrated with known solutions containing mixtures of $H^+$, $Na^+$ and $K^+$ as is well known in the art, and then the $K^+$ concentration of unknown solutions can be determined directly by subjecting the glass and reference electrodes to the unknown solutions according to the usual procedure. For example, one can employ the following known equation for mixtures having a wide range of pH (e.g. approximately 5 to 11):

$$E = E° + \frac{RT}{F} \ln[(Na^+) + K_{NaK}(K^+)]$$

wherein:

$E$ = measured E.M.F.
$E°$ = standard potential
$R$ = ideal gas equation constant
$T$ = absolute temperature
$F$ = Faraday constant
$(Na^+)$ and $(K^+)$ = activity or concentration of the ionic species $Na^+$ and $K^+$, respectively
$K_{NaK}$ = empirical constant for a given glass composition and ionic pair $Na^+$ and $K^+$; when $>1$, it represents selectivity factor for $K^+$ in preference to $Na^+$ on a mole for mole basis.

At an appropriate pH, the equipment is used to measure on potentiometer 16 the potentials of a 0.1 N solution of $Na^+$ and a 0.1 N solution of $K^+$ using a glass electrode of this invention. Employing the above equation, the values of $E°$ and $K_{NaK}$ can be calculated. Next, the same equipment is used to measure the potential of an unknown solution. Then, employing the above equation again, one can insert the value of $(Na^+)$, when known or measured by other known means (e.g. flame photometer or glass electrode selective for $Na^+$), and solve for $(K^+)$. For extreme precision, one can solve simultaneously the equations for the potentials of the unknown mixture, measured on the one hand with a $Na^+$ selective electrode and on the other hand with our $K^+$ selective electrode of this invention, using the values of $E°$ and $K_{NaK}$ for each of these electrodes in the respective equation.

An example of our novel $K^+$ selective glass composition that was melted and formed into a membrane according to conventional techniques is $KGS_{20-10}$ (i.e. a glass composed essentially of 20 mole percent $K_2O$, 10 mole percent $Ga_2O_3$ and 70 mole percent $SiO_2$—the subscripts indicate the $K_2O$ and $Ga_2O_3$ contents in mole percent, and the letters indicate all the oxide constituents, except for incidental impurities, in the glass, namely, $K_2O$, $Ga_2O_3$ and $SiO_2$). This glass has a ratio of mole percent $K_2O$ to mole percent $Ga_2O_3$ equal to 2.0 and was found to exhibit a $K^+$ selectivity factor of 6.0 (i.e. it was 6.0 times more selective for $K^+$ than for $Na^+$ in mixtures of these two ions on a mole for mole basis). After a substantial period of aging, this glass still exhibited a $K^+$ selectivity factor of 3.3.

As one illustration of the importance of the minimum ratio of mole percent $K_2O$ to mole percent $Ga_2O_3$ equal to 1.6, a glass composition $KGS_{15-15}$ was found to be equally sensitive to $Na^+$ and to $K^+$ in mixtures of these two ions (i.e. selectivity factor equal to 1 for both ions) and, after a substantial aging period, it was found to be somewhat selectively sensitive to $Na^+$ in preference to $K^+$. Preferably, the ratio of mole percent $K_2O$ to mole percent $Ga_2O_3$ should be kept at least as high as 2.0 for optimum results.

From our studies, it appears that it is possible to obtain higher $K^+$ selectivity factors by substituting rubidium oxide and/or cesium oxide for potassium oxide, in part or in whole. Suitable $K^+$ selective electrode sensing portions can be made of either of the following glass compositions: (1) $KGS_{27-3}$ (27 mole percent $K_2O$, 3 mole percent $Ga_2O_3$, 70 mole percent $SiO_2$), (2) $RGS_{15-10}$ (15 mole percent $Rb_2O$, 10 mole percent $Ga_2O_3$, 75 mole percent $SiO_2$), (3) $RGS_{20-10}$ (20 mole percent $Rb_2O$, 10 mole percent $Ga_2O_3$, 70 mole percent $SiO_2$), (4) $CGS_{15-15}$ (15 mole percent $Cs_2O$, 15 mole percent $Ga_2O_3$, 70 mole percent $SiO_2$) and (5) $CGS_{20-10}$ (20 mole percent $Cs_2O$, 10 mole percent $Ga_2O_3$, 70 mole percent $SiO_2$).

The active or sensitive glass composition according to this invention need contain only more than a fraction of a mole percent of $Ga_2O_3$ in the substantial absence of constituents other than glass network forming oxides and the above named alkali metal oxides. However, at least about 2 mole percent of $Ga_2O_3$ is preferred and this is usually the practical minimum in most cases. The more common network forming oxide $SiO_2$ may be partially or totally replaced by other glass network forming oxides, for example, $GeO_2$. Preferably, the glass network forming oxides comprise at least about 50 mole percent for durability of the glass and not more than about 75 mole percent in order to avoid undesirably high electrical resistivity in the glass.

It should be understood that the property of $K^+$ selectivity relative to $Na^+$ is a function of the $R_2O:Ga_2O_3$ mole percent ratio (where R is selected from K, Rb and/or Cs) as specified above regardless of the presence or absence of any other oxides in addition to the network forming oxides in the glass (except, for example, substantial amounts of the other alkali metal oxides $Li_2O$ and $Na_2O$). One or more of other oxides such as MgO, CaO, BaO, SrO, CuO, ZnO, $Fe_2O_3$ and $B_2O_3$ can be added up to several mole percent (e.g. up to about 3 mole percent ZnO for chemical durability) to improve the physical and/or chemical properties of the glass without seriously affecting the $K^+$ selectivity of the electrode. Moreover, it is within the scope of this invention to substitute at least one oxide selected from the group consisting of $Li_2O$ and $Na_2O$ for some of the $K_2O$, $Rb_2O$ and/or $Cs_2O$ such that the mole percent $Li_2O$ and $Na_2O$ never exceeds the sum of the individual mole percents of $K_2O$, $Rb_2O$ and $Cs_2O$ and provided that the sum of 0.25 times the mole percent $Li_2O$ plus 0.35 times the mole percent $Na_2O$ plus 0.625 times the mole percent $K_2O$ plus the mole percent $Rb_2O$ plus 1.053 times the mole $Cs_2O$ at least equals the mole percent $Ga_2O_3$. Furthermore, $Al_2O_3$ may be substituted for part of the gallium oxide in the ratio of 0.9 mole percent $Al_2O_3$ for 1 mole percent $Ga_2O_3$ up to an alumina content not exceeding the gallium oxide content. Obviously, in this manner, every 0.9 mole percent $Al_2O_3$ is equivalent to 1 mole percent $Ga_2O_3$. Therefore, in determining the above noted mole percent ratios and other relationships between alkali metal oxides and $Ga_2O_3$, the total effective amount of $Ga_2O_3$ is arrived at by taking into account the amount of $Al_2O_3$ in terms of its equivalent amount of $Ga_2O_3$ present in the glass composition. Of course, the small 0.1 mole percent difference between every 0.9 mole percent $Al_2O_3$ and the 1 mole percent $Ga_2O_3$ it replaced is made up mainly by the predominant constituent of the glass composition, viz. the glass network forming oxide. Such limited substitution will not materially affect the good $K^+$ sensitivity of the electrode.

The electrodes of this invention are generally indifferent to the particular anion present, such as chloride, bromide, iodide, hydroxyl, carbonate, bicarbonate, nitrate, acetate, sulphate, thiosulphate, ferrocyanide, ferricyanide, phosphate, etc. Nor are they affected by the presence of oxidizing or reducing substances.

It will be appreciated that the invention is not limited to the specific details shown in the examples and illustrations, and that various changes or modifications may be made within the ordinary skill of the art without departing from the spirit and scope of the invention.

We claim:

1. A glass electrode, including an active portion, for measuring potassium ion activity in ionic mixtures including the sodium, potassium and hydrogen ions, said active portion having a good selective sensitivity for potassium ions in said mixtures and being made of a glass composition consisting essentially of gallium oxide, glass network forming oxide and oxide of alkali metal selected from the group consisting of potassium where the ratio of the mole percent of $K_2O$ to $Ga_2O_3$ is at least 1.6, rubidium where the ratio of the mole percent of $Rb_2O$ to $Ga_2O_3$ is at least 1.0, cesium where the ratio of the mole percent of $Cs_2O$ to $Ga_2O_3$ is at least 0.95, and mixtures of these named oxides of alkali metals where the sum of 0.625 times the mole percent $K_2O$ plus the mole percent $Rb_2O$ plus 1.053 times the mole percent $Cs_2O$ at least equals the mole percent $Ga_2O_3$, said glass network forming oxide being at least about 50 mole percent of said composition.

2. A glass electrode of claim 1 wherein the glass network forming oxide is selected from the class consisting of $SiO_2$, $GeO_2$ and mixtures thereof.

3. A glass electrode of claim 1 wherein alumina is substituted for part of the gallium oxide in the ratio of 0.9 mole percent $Al_2O_3$ for 1 mole percent $Ga_2O_3$ up to an alumina content not exceeding the gallium oxide content.

4. A glass electrode of claim 1 wherein a minor amount of at least one oxide of alkali metal selected from the group consisting of lithium and sodium is substituted for part of said named oxides of alkali metals such that the total mole percent of $Li_2O$ and $Na_2O$ never exceeds the sum of the mole percents of $K_2O$, $Rb_2O$ and $Cs_2O$ and provided that the sum of 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ at least equals the mole percent $Ga_2O_3$.

5. A glass electrode, including an active portion, for measuring potassium ion activity in ionic mixtures including the sodium, potassium and hydrogen ions, said active portion having a good selective sensitivity for potassium ions in said mixtures and being made of a glass composition consisting essentially of gallium oxide, glass network forming oxide and potassium oxide where the ratio of the mole percent of $K_2O$ to $Ga_2O_3$ is at least 1.6, said glass network forming oxide being about 50 to 75 mole percent of said composition.

6. A glass electrode, including an active portion, for measuring potassium ion activity in ionic mixtures including the sodium, potassium and hydrogen ions, said active portion having a good selective sensitivity for potassium ions in said mixtures and being made of a glass composition consisting essentially of gallium oxide, glass network forming oxide and rubidium oxide where the ratio of the mole percent of $Rb_2O$ to $Ga_2O_3$ is at least 1.0, said glass network forming oxide being about 50 to 75 mole percent of said composition.

7. A glass electrode, including an active portion, for measuring potassium ion activity in ionic mixtures including the sodium, potassium and hydrogen ions, said active portion having a good selective sensitivity for potassium ions in said mixtures and being made of a glass composition consisting essentially of gallium oxide, glass network forming oxide and cesium oxide where the ratio of the mole percent of $Cs_2O$ to $Ga_2O_3$ is at least 0.95, said glass network forming oxide being about 50 to 75 mole percent of said composition.

8. A glass electrode, including an active portion, for measuring potassium ion activity in ionic mixtures including the sodium, potassium and hydrogen ions, said active portion having a good selective sensitivity for potassium ions in said mixtures and being made of a glass composition consisting essentially of gallium oxide, glass network forming oxide and a mixture of oxides of potassium, rubidium and cesium where the sum of 0.625 times the mole percent $K_2O$ plus the mole percent $Rb_2O$ plus 1.053 times the mole percent $Cs_2O$ at least equals the mole percent $Ga_2O_3$, said glass network forming oxide being about 50 to 75 mole percent of said composition.

9. A glass composition exhibiting a good selective sensitivity to potassium ions in ionic mixtures including the sodium, potassium and hydrogen ions, said composition consisting essentially of gallium oxide, glass network forming oxide and oxide of alkali metal selected from the group consisting of potassium where the ratio of the mole percent of $K_2O$ to $Ga_2O_3$ is at least 1.6, rubidium where the ratio of the mole percent of $Rb_2O$ to $Ga_2O_3$ is at least 1.0, cesium where the ratio of the mole percent of $Cs_2O$ to $Ga_2O_3$ is at least 0.95, and mixtures of these named alkali metals where the sum of 0.625 times the mole percent $K_2O$ plus the mole percent $Rb_2O$ plus 1.053 times the mole percent $Cs_2O$ at least equals the mole percent $Ga_2O_3$, said glass network forming oxide being at least about 50 mole percent of said composition.

10. A glass composition of claim 9 wherein the glass network forming oxide is selected from the class consisting of $SiO_2$, $GeO_2$ and mixtures thereof.

11. A glass composition of claim 9 wherein alumina is substituted for part of the gallium oxide in the ratio of 0.9 mole percent $Al_2O_3$ for 1 mole percent $Ga_2O_3$ up to an alumina content not exceeding the gallium oxide content.

12. A glass composition of claim 9 wherein a minor amount of at least one oxide of alkali metal selected from the group consisting of lithium and sodium is substituted for part of said named oxides of alkali metals such that the total mole percent of $Li_2O$ and $Na_2O$ never exceeds the sum of the mole percents of $K_2O$, $Rb_2O$ and $Cs_2O$ and provided that the sum of 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ at least equals the mole percent $Ga_2O_3$.

13. In a process of selectively measuring potassium ion activity in an ionic mixture including the sodium, potassium and hydrogen ions, which process includes the steps of providing a glass electrode with an active portion that is selectively sensitive to potassium ions in the presence of other cations including sodium and hydrogen ions, subjecting the mixture to said electrode and to a standard reference half-cell, and operatively connecting the glass electrode and reference half-cell to a high impedance electrometric amplifier, the improvement comprising making said active portion from a composition consisting essentially of gallium oxide, network forming oxide and oxide of alkali metal selected from the group consisting of potassium where the ratio of the mole percent of $K_2O$ to $Ga_2O_3$ is at least 1.6, rubidium where the ratio of the mole percent of $Rb_2O$ to $Ga_2O_3$ is at least 1.0, cesium where the ratio of the mole percent of $Cs_2O$ to $Ga_2O_3$ is at least 0.95, and mixtures of these named alkali metals where the sum of 0.625 times the mole percent $K_2O$ plus the mole percent $Rb_2O$ plus 1.053 times the mole percent $Cs_2O$ at least equals the mole percent $Ga_2O_3$, said glass network forming oxide being at least about 50 mole percent of said composition.

14. The process of claim 13 wherein the glass network forming oxide is selected from the class consisting of $SiO_2$, $GeO_2$ and mixtures thereof.

15. The process of claim 13 wherein alumina is substituted for part of the gallium oxide in the ratio of 0.9 mole percent $Al_2O_3$ for 1 mole percent $Ga_2O_3$ up to an alumina content not exceeding the gallium oxide content.

16. The process of claim 13 wherein a minor amount of at least one oxide of alkali metal selected from the group consisting of lithium and sodium is substituted for part of said named oxides of alkali metals such that the total mole percent of $Li_2O$ and $Na_2O$ never exceeds the sum of the mole percents of $K_2O$, $Rb_2O$ and $Cs_2O$ and provided that the sum of 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ at least equals the mole percent $Ga_2O_3$.

References Cited

UNITED STATES PATENTS

| | | |
|---|---|---|
| 2,829,090 | 4/1958 | Eisenman et al. 204—1 |
| 3,041,252 | 6/1962 | Eisenman et al. 204—1 |

OTHER REFERENCES

Nikol'skii et al., "Doklady Akad. Nauk., SSSR," 1962, 144(4), pages 844–848.

ROBERT K. MIHALEK, *Primary Examiner.*

T. TUNG, *Assistant Examiner.*